United States Patent [19]
Feldewerth et al.

[11] Patent Number: 5,513,834
[45] Date of Patent: May 7, 1996

[54] PREPARATION OF HIGH PURITY ELEMENTS

[75] Inventors: Gerald B. Feldewerth, Spokane; Alan B. I. Bollong, Veradale; David C. Bunnell, Spokane, all of Wash.

[73] Assignee: Johnson Matthey Electronics, Inc., Spokane, Wash.

[21] Appl. No.: 339,453

[22] Filed: Nov. 14, 1994

Related U.S. Application Data

[62] Division of Ser. No. 106,374, Aug. 13, 1993, abandoned.
[51] Int. Cl.$^6$ .................................................. C21D 11/00
[52] U.S. Cl. ............................................. 266/87; 266/148
[58] Field of Search ............................... 266/148, 78, 87; 23/273 SP; 156/609; 422/245

[56] References Cited

U.S. PATENT DOCUMENTS

| | | | |
|---|---|---|---|
| 3,833,342 | 9/1974 | Holliday et al. | 23/273 SP |
| 3,909,246 | 9/1975 | Cole et al. | 75/65 ZM |
| 4,038,375 | 7/1977 | Vorachek et al. | 423/510 |
| 4,298,380 | 11/1981 | Bochkarev et al. | 75/101 BE |
| 4,581,218 | 4/1986 | Nicolau | 423/491 |
| 4,584,054 | 4/1986 | Holland | 156/609 |
| 4,690,725 | 9/1987 | Bult et al. | 156/617 |
| 4,720,373 | 1/1988 | Holland | 422/245 |
| 4,888,051 | 12/1989 | Bollong et al. | 75/10.11 |
| 5,258,055 | 11/1993 | Pargeter et al. | 75/665 |

OTHER PUBLICATIONS

L. R. Holland, "Combined Distillation and Normal Freezing to Purify Elements of Groups II and VI," *Journal of Crystal Growth* 70 (Dec. 1984), pp. 280–286, North–Holland, Amsterdam.

A. B. Bollong et al., "The Ultrapurification of Tellurium," *Journal of the Minerals, Metals & Materials Society*, vol. 41, No. 7 (Jul. 1989, pp. 39–41.

L. Rowinska et al. "Efficiency of Metal Purification by Vacuum Distillation Technique," *Nukleonika* 31 (Dec. 1986), pp. 151–160.

D. S. Mungekar et al., "Preparation of High Purity Tellurium," *Indian Journal of Technology* 11 (Jan. 1973), pp. 13–16.

V. N. Vigdorovich et al., "High–Purity Tellurium Production by Modified Recrystallization," *Tsvetnye Metally/Non–Ferrous Metal* (UDC 669.77:621.315.592:546.24).

B. D. Wedlock, "Purification of Tellurium by Distillation," *Journal of the Electrochemical Society* 109 (Apr. 1962), pp. 318–321.

B. N. Aleksandrov, "The Zone Refining of Zinc and Cadmium," source unknown.

R. F. Redden et al., "The Purification of Cd and Te by Zone Refining," Cominco Electronic Materials, Trail, British Columbia, Canada V1R 4L8.

P. E. Skinner, "The Recovery and Production of Tellurium and Some of its Salts," Johnson Matthey Chemicals Ltd., Royston, Hertfordshire, England.

*Primary Examiner*—Scott Kastler
*Attorney, Agent, or Firm*—Christie, Parker & Hale

[57] ABSTRACT

Described is in situ refining high purity elements in Groups IIA and VIB of the Periodic Table in a hermetically sealed apparatus by distilling, condensing and zone refining material within the apparatus.

2 Claims, 6 Drawing Sheets

PREPARATION OF HIGH PURITY ELEMENTS

This is a division of application Ser. No. 08/106,374, filed Aug. 13, 1993, now abandoned.

BACKGROUND OF THE INVENTION

The present invention relates to a system for in situ refining elements to very low impurities; more particularly, refining high purity elements to further reduce impurities. Still more particularly, the invention relates to a method and apparatus for the preparation of high purity elements of Groups IIA and VIB of the Periodic Table of Elements.

It is desirable for many applications to provide high purity material exceeding 99.9999% purity, and to reduce impurity levels of certain contaminants to one part per billion atomic (ppb) or less. For example, the performance of infrared devices is adversely affected by the presence of impurities, even some impurities in the parts or subparts per billion range.

Many techniques have been proposed to produce high purity material, including purification techniques using distillation and/or zone refining. However, these techniques have not adequately eliminated certain critical impurities to the extent desired. The technique itself may be insufficient or contamination may occur in the purification process or in transfer of material between purification treatments.

The present invention combines distillation and zone refining in such a way as to reduce impurity levels to extremely low values.

SUMMARY OF THE INVENTION

The present invention provides a system for in situ purification of high purity material which combines distillation and zone refining under controlled conditions and which is capable of reducing nonisoelectronic metallic impurities to 100 ppb atomic or less. The process is described as in situ because distillation and zone refining are performed in the same apparatus without intermediate handling. In accordance with the present invention, a system of in situ refining is provided whereby elements of relatively high purity, e.g. 99.9% purity or greater, are distilled to produce a distillate, the distillate is condensed at a temperature lower than the distillation temperature to produce a liquid or solid condensate, and the condensate is further refined, in the same apparatus, to a purity higher than the purity of the starting material by zone refining.

The distillation and zone refining are performed in situ in a hermetically sealed apparatus having separately controlled temperature zones. Source material is vaporized from a feed receptacle for condensation in the collection receptacle. A minor fraction of source material is not vaporized to retain low vapor pressure impurities. Once vaporization/condensation has been completed, alternating segments of solid and liquid are formed in the condensate. The temperature is varied along the length of the condensate so that adjacent portions of the condensate are progressively melted and solidified. The liquid zones are progressively moved, preferably toward one end. The material is solidified behind the moving liquid segment so that, after solidification, an ingot is produced. The progressive movement of the liquid zone has the effect of moving the impurities remaining in the condensate to one end which, upon solidification of the whole into an ingot, can be cropped to remove the impurities, leaving a central ingot of very high purity, i.e. less than 100 ppb atomic of nonisoelectronic metallic impurities as well as a vast number of elements in amounts as low as 10 ppb atomic or lower. As used here, "isoelectronic" elements are those in Groups IIA and VIB of the Periodic Table; metallic impurities refer to elements other than C, N, O and Si.

The system includes a hermetically sealed apparatus having both a distillation zone and a refining zone, each zone having at least one receptacle or "boat," as they are known. In practice, the apparatus contains two boats, a distillation or "feed" boat and a condensation or "collection" boat. The feed boat is in the distillation zone and the collection boat is in the refining zone. Source or feed material, such as solid pieces of 99.99% purity elements of Groups IIA and VIB of the Periodic Table, are placed in the feed boat for distillation within the apparatus. The temperature of the distillation zone is increased to the appropriate distillation temperature to melt and distill the feed material while the temperature of the refining zone is maintained at a lower temperature but preferably above the melting temperature of the material. As the material is distilled from the feed boat, it condenses as a liquid in the collection boat within the apparatus. In cases where high vapor pressure impurities are not present a "liquid to solid" distillation, with collection temperature below the melting point, is also acceptable. Following completion of distillation, the temperature of the distillation zone is reduced, allowing any material remaining in the feed boat to solidify. The temperature of the refining zone is controlled so as to produce alternate segments of molten and solidified material in the collection boat. Zone refining is accomplished by progressively moving molten segments the length of the material in the collection boat while solidifying the material behind the moving molten segment as the molten segment is moved. Progressively moving segments of molten material enhances impurity segregation toward the end(s) of the material in the collection receptacle. In this manner, impurities are continuously moved toward at least one end of the boat so as to form an ingot wherein all the impurities are localized at the ends and may be cropped, leaving an ingot of very high purity material.

In the liquid-to-liquid in situ refining embodiment of the invention (i.e. liquid material is distilled and liquid condensate is collected), the temperature is controlled so low vapor pressure impurities are not vaporized, remaining in the feed boat, and high vapor pressure impurities do not condense in the collection boat; therefore, both low and high vapor pressure impurities are removed. Thus, by adjusting the temperature so that it is not higher than the distillation temperature of the low vapor pressure impurities but high enough to avoid condensing the high vapor pressure impurities in the collection boat during distillation, impurities in the condensed material are minimized. The low vapor pressure impurities remain in the feed boat and the high vapor pressure impurities do not condense in the collection boat.

DETAILED DESCRIPTION OF THE INVENTION

Figure 1:
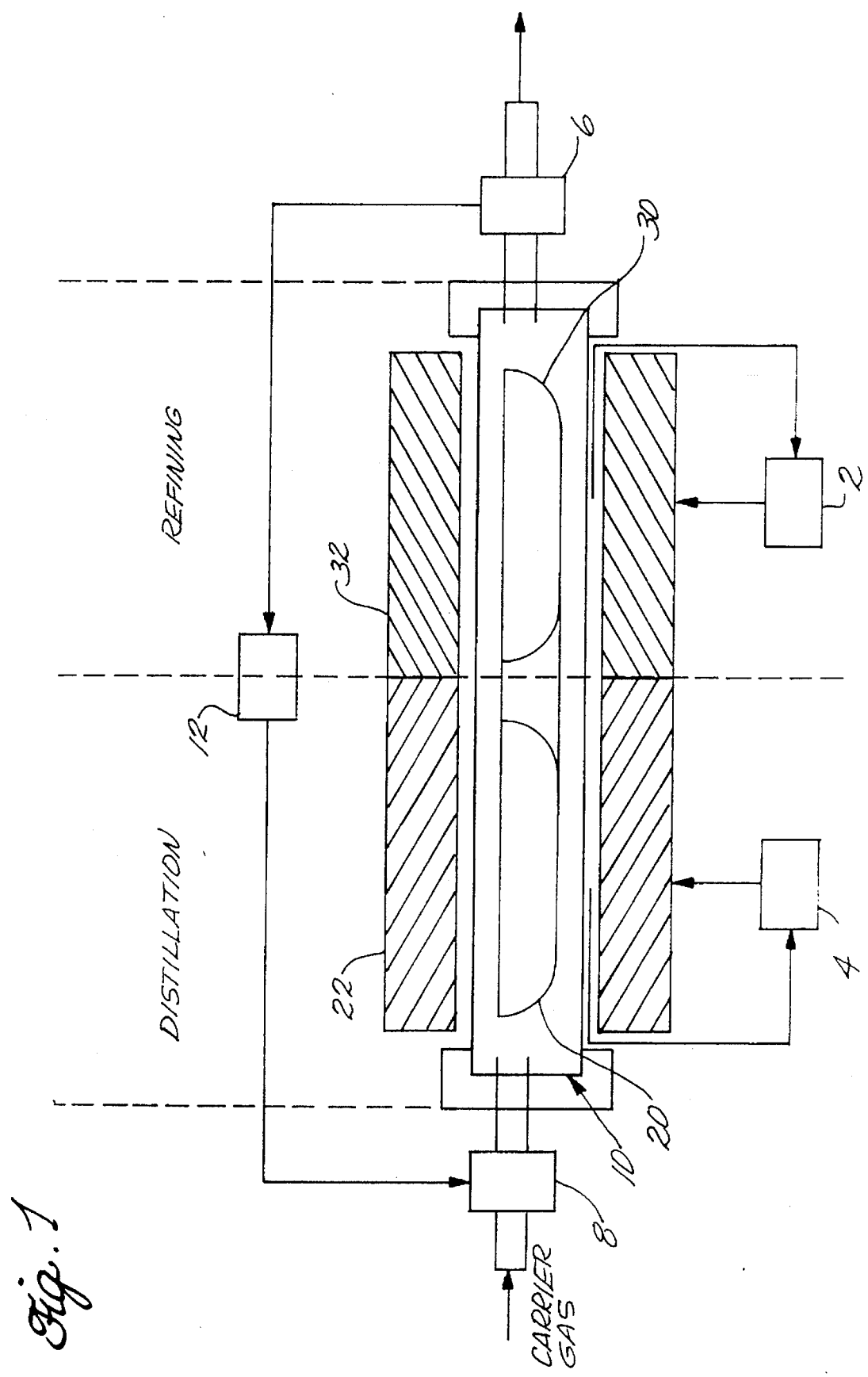
FIG. 1 is a schematic drawing of the apparatus of the in situ refining system showing both the distillation and refining zones.

The following is a description of the system for purification with reference to the accompanying drawings.

As can be seen, the apparatus 10 includes a distillation zone and a refining zone. Within these zones are a feed boat 20 and a collection boat 30, respectively, under a cover 40. Separate heating means 22 and 32 control the temperature in the distillation and refining zones, respectively. Advantageously, the heating means are resistance heaters, best seen in FIGS. 4 and 5, some of which are selectively removable in the refining zone. The apparatus is equipped with suitable control valve 8 and pressure sensor 6. A nonoxidizing atmosphere is maintained by introducing a suitable carrier gas, such as a reducing gas, e.g. hydrogen, into the apparatus and establishing a reduced pressure condition within the apparatus by means of the pressure sensor 6 and a vacuum control loop 12. Temperature control loops 4 and 2 are provided to regulate the temperature.

Figure 2:
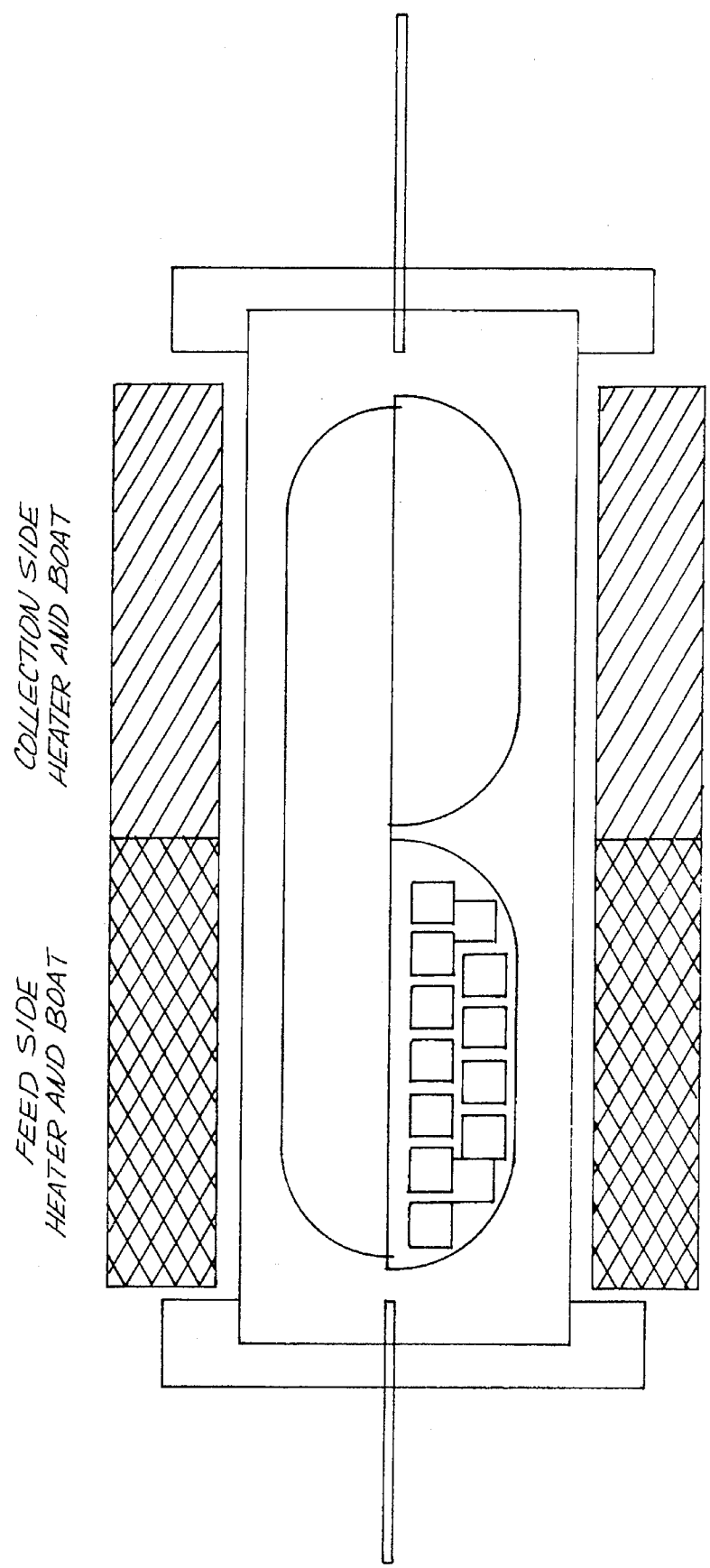
FIG. 2 is a schematic drawing of the apparatus showing the charged or "loaded" feed boat in the apparatus.
Figure 3:
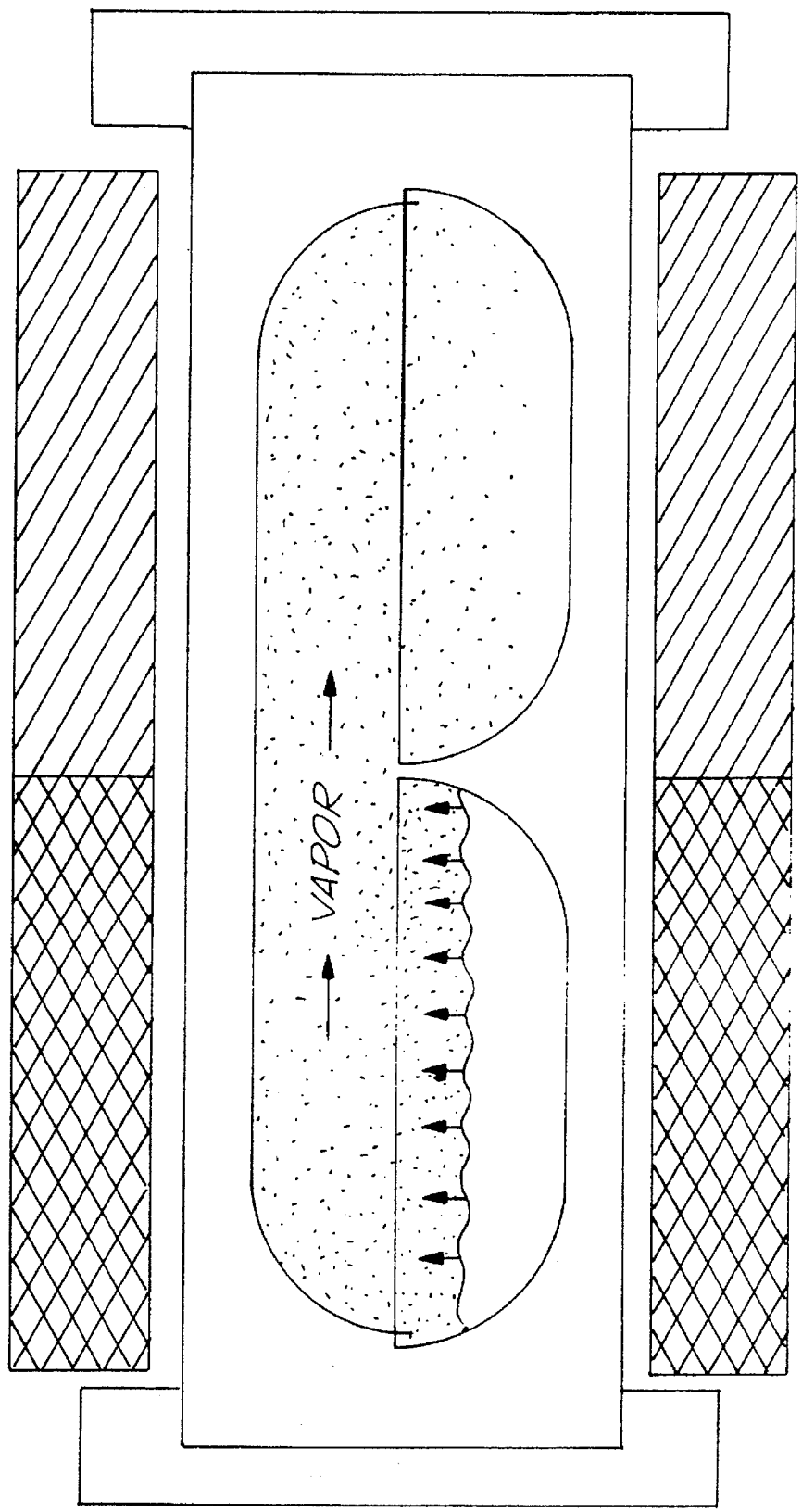
FIG. 3 is a schematic drawing of the apparatus showing the distillation of the feed from the feed boat and the collection of the condensate in the condensation boat.
Figure 4:
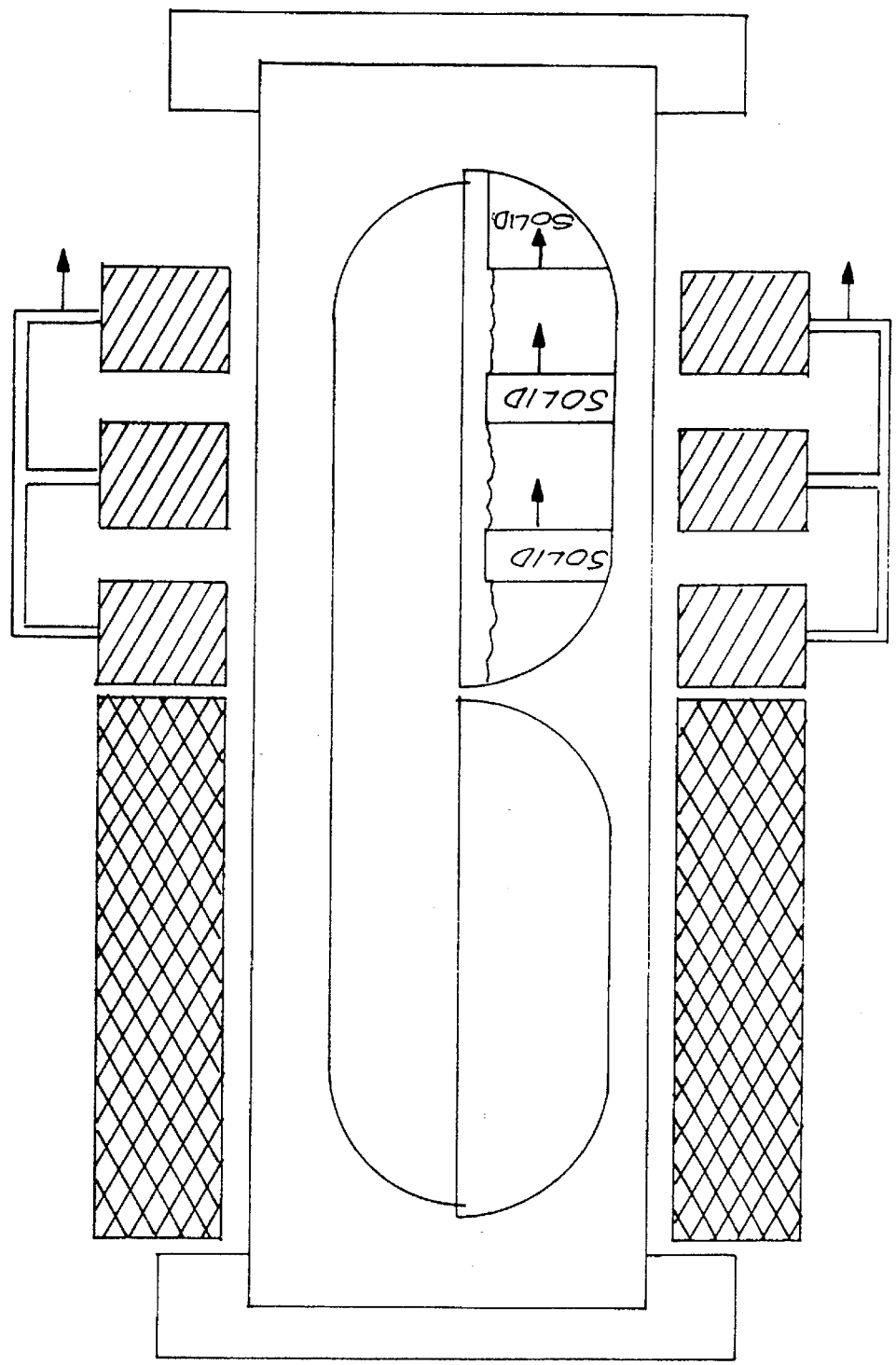
FIG. 4 is a schematic drawing showing the configuration of the condensate in the collection boat in the refining zone of the apparatus.
Figure 5:
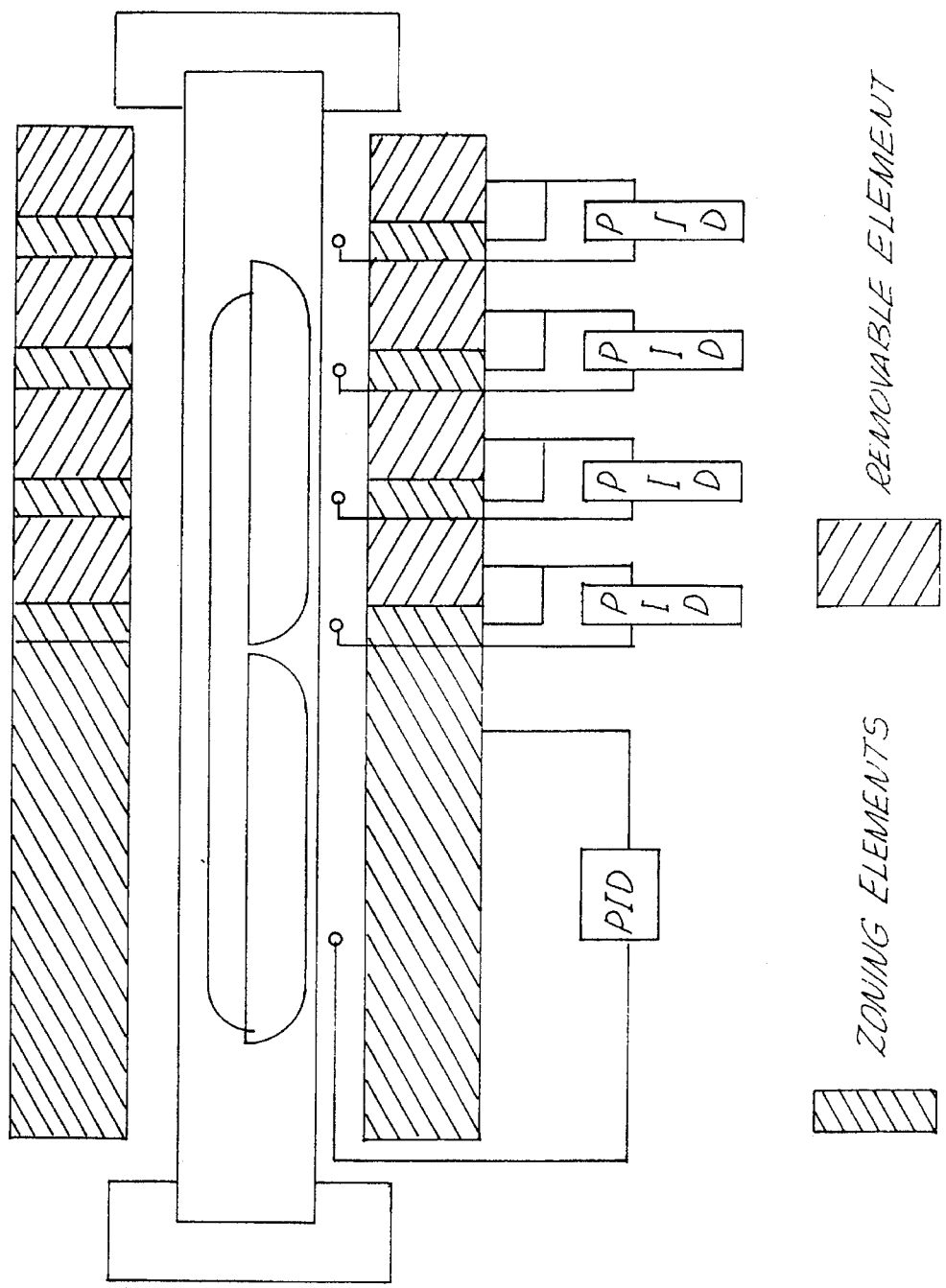
FIG. 5 is a schematic drawing of the apparatus showing the disposition of the heating elements, including removable elements, of the refining zone of the apparatus.
Figure 6:
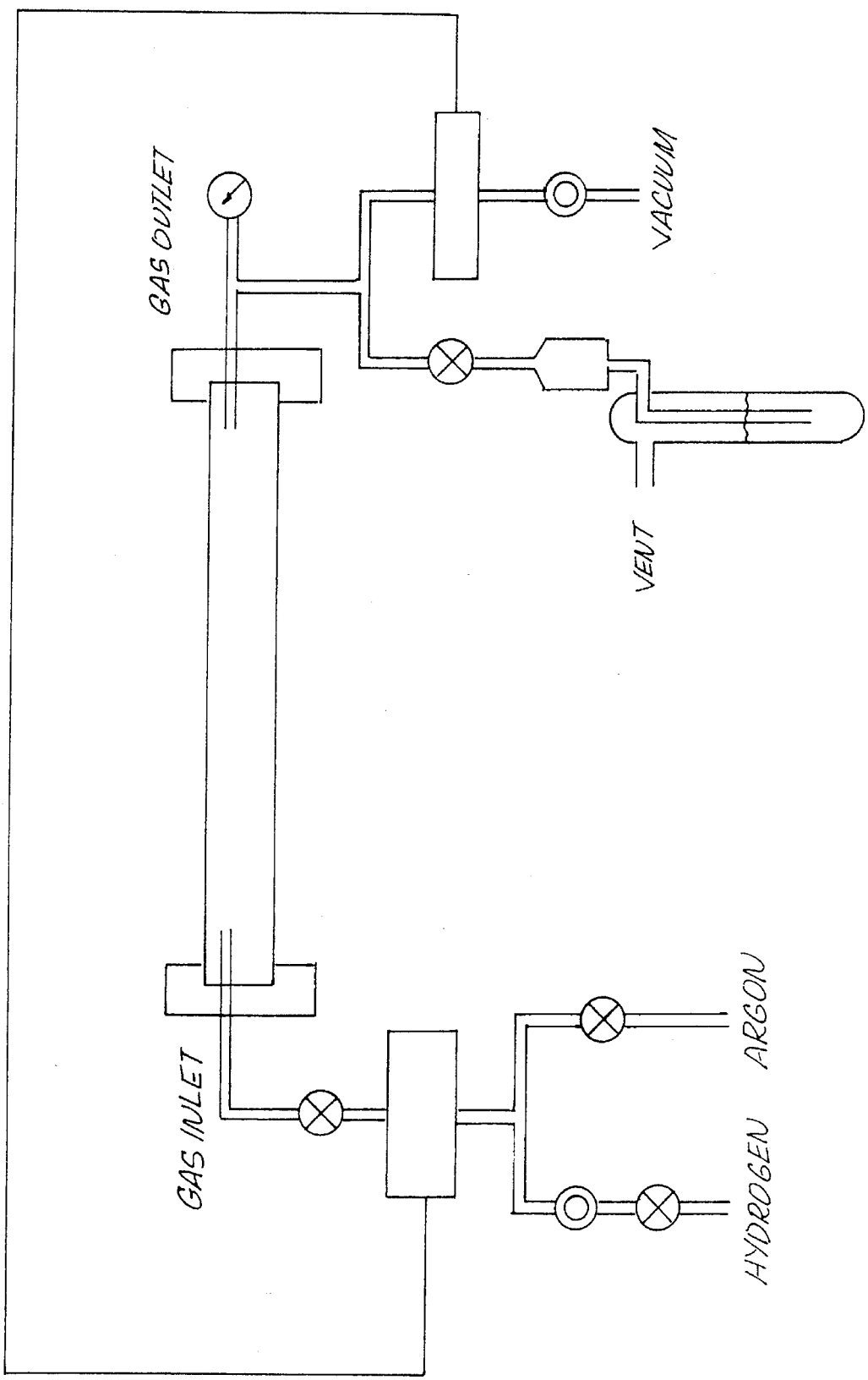
FIG. 6 is a schematic drawing showing the control loop for the pressure control system of the apparatus.

The control of temperature within the apparatus is effected by use of controllable heating elements disposed in pairs. The pieces of high purity material to be further refined are disposed in the distillation boat, shown in FIG. 2, over which a suitable cover 40 extends to encompass both the feed boat 20 and the collection boat 30. During operation, material in the distillation boat is vaporized and then condensed in the condensation boat as shown in FIGS. 3 and 4. To accomplish refining, the heating elements for the refining zone are adjusted, for example by removing alternate resistance heating elements, to achieve a condition of adjacent solid and liquid segments of the condensate, as shown in FIG. 5. A suitable pressure control system may be provided as shown in the control loop described in FIG. 6 to maintain pressure control.

The equipment preferably consists of a quartz process tube, quartz feed and collection boats, a quartz cover for the boats, a vacuum or pressure control system, and a heating system. The first step of the process is to load the feed material in the feed boat and initiate distillation by placing end caps on the process tube while evacuating the tube to less than $1 \times 10^{-2}$ torr, introducing hydrogen into the tube until the pressure is raised to within the range of 0.05 to 100 torr, increasing the collection temperature, i.e. condensation temperature, to the desired level using a bank of individually removable resistance heaters in the refining zone and then increasing the temperature in the distillation zone to the appropriate level to accomplish distillation of the material to be purified.

Distillation is continued until the desired amount of material has been transferred to the collection boat from the feed boat by distillation, at which time distillation is terminated by increasing the pressure and decreasing the temperature in the distillation zone. To do this, pressure is usually increased to 1 torr by addition of the carrier gas, e.g. hydrogen, and once the distillation is ended, the removable heating elements in the refining zone are selectively detached so that the zoning elements are set to the desired temperatures to produce alternate segments of solid and liquid material in the collection boat. Desirably, a pressure of 1 torr may be maintained, however it is also possible to accomplish zone refining at lesser pressures. Molten segments form and are moved laterally along the bar or ingot in the condensation boat by translating the zone-refining heating elements. The heaters and molten segments are translated preferably at a rate of 1–15 cm per hour in the forward direction. (See FIG. 4.) After being translated the appropriate distance between resistance heaters, each heater quickly retraces to its original position. This scheme maintains several molten segments between solid segments in the material at all times until completed and is re-indexed until the desired number of zone pass iterations is completed. Once the refining is complete, the heaters are turned off and the material is allowed to cool. The boats and lids are removed from the apparatus. Since usually the impurities are localized at one end of the ingot, the ingot end may be cropped to leave an ingot of high purity material. However, it could be that some impurities would migrate to the other end, in which case both ends would be cropped to remove impurities. If the uncropped ingot is, for example, 75 cm in length, about 10 cm will be cropped from the ends to assure the purity of the balance of the ingot.

Material produced by the in situ refining process has a lower concentration of impurities than is obtainable by other techniques. Typical conditions for distillation, condensation and zone refining as may be applicable for elements in Groups IIA and VIB of the Periodic Table are summarized in Table I below. The condensation temperature may be from 10% below the $T_{mp}$, when a solid is condensed, to 10% above the $T_{mp}$, when a liquid is condensed. However, condensation temperatures of 0–10% above $T_{mp}$ are preferred.

TABLE I

| DISTILLATION | | ZONE REFINING | |
| --- | --- | --- | --- |
| Distillation Temperature | 20–60% above $T_{mp}$ | Zone Temperature | 0–5% above $T_{mp}$ |
| Condensation Temperature | 10% below to 10% above $T_{mp}$ | Zone Length | 1–20 cm |
| Distillation Pressure | 0.05–100 torr | Zone Speed | 2–8 cm per hour |
| Carrier Gas | inert or reducing gas or gas mixtures | Atmosphere | inert or reducing gas or gas mixtures |
| | | Pressure | 0.1–1 torr |

$T_{mp}$ = absolute melting temperature of a material

To illustrate the invention, process conditions are given in Table II for in situ refining of illustrative elements, tellurium, cadmium and zinc. As can be seen, in each case the raw material, i.e. "feed," was comprised of material of at least 99.9% purity. The distillation temperature and condensation temperature are as indicated in Table II along with the zone temperature setting for each element. This setting is used to control the temperature of the heating elements used during zone refinement and varies depending upon the design of the zone refining equipment, particularly the width of the zones. Obviously, however, the temperature may be adjusted until the molten zones in the zone refining process are any desired length. In these examples, the zone speed for zone refining was 5 cm per hour and the carrier gas used was hydrogen.

TABLE II

| Material | Tellurium | Cadmium | Zinc |
| --- | --- | --- | --- |
| Feed Purity | 99.99–99.9999% | 99.99–99.999% | 99.9–99.999% |

TABLE II-continued

| Material | Tellurium | Cadmium | Zinc |
|---|---|---|---|
| Distillation Feed Temperature | 650–700° C. | 525–575° C. | 625–675° C. |
| Distillation Collection Temperature | 400–450° C. | 300–350° C. | 375–425° C. |
| Distillation Pressure | 0.1–1 torr | 0.1–1 torr | 1 torr |
| Carrier Gas | hydrogen | hydrogen | hydrogen |
| Zone Temperature Setting | 625–675° C. | 500–550° C. | 600–650° C. |
| Zone Speed | 5 cm/hour | 5 cm/hour | 5 cm/hour |
| Gas | hydrogen | hydrogen | hydrogen |

Impurity concentrations resulting from the practice of the present invention are generally at or below the parts per billion range. Such small impurity concentrations are very difficult to measure and it is generally understood that the accuracy of available analytical techniques is approximately ±20%. Also, each analytical technique has a detectability limit for each impurity being analyzed. Therefore, reporting exact impurity concentrations is difficult. The technique most commonly used for measuring impurity concentrations of this order of magnitude and for the materials treatable by the present invention is the "Glow Discharge Mass Spectroscopy" (GDMS) method. The results using this technique are fairly consistent with detectability limits for most elements below about 10 ppb atomic. Results of GDMS analysis are normally reported as a measured impurity concentration or "below the detectability limit."

Using the above-described convention, the in situ refining process of the present invention is capable of reducing nonisoelectronic metallic elements below 100 ppb atomic and the impurity concentrations below the detectability limit, as measured by GDMS, in tellurium, cadmium and zinc of the following elements; however, most notably for infrared applications, copper can be reduced to 1 ppb atomic or less:

Tellurium: Li, Be, B, F, P, S, K, Ca, Sc, V, Cr, Mn, Co, Ni, Zn, Ge, As, Rb, Sr, Y, Zr, Nb, Mo, Ag, Cd, In, Sn, Sb, I, Cs, Ba, La, Ce, Hf, W, Pt, Au, Hg, Tl, Pb, Bi, Th, U, Na, Mg, Ti, S, Cl, Ti and Ni.

Cadmium: Li, Be, B, F, Na, Mg, Si, P, K, Ca, Sc, V, Cr, Mn, Fe, Co, Cu, Ga, Ge, As, Rb, Sr, Y, Zr, Nb, Mo, Ag, In, Sn, Sb, I, Cs, Ba, La, Ce, Hf, W, Pt, Au, Pb, Bi, Th, U, Al, Si, S, Cl, Ti and Ni.

Zinc: Li, Be, B, F, Na, Mg, Al, P, S, Cl, K, Ca, Sc, V, Cr, Mn, Co, Ni, Zn, Ge, As, Rb, Sr, Y, Zr, Nb, Mo, Ag, In, Sn, Sb, I, Cs, Ba, La, Ce, Hf, W, Pt, Au, Hg, Bi, Th, U.

The average and maximum amounts of impurity concentrations detected in the materials produced using the above-described convention are given in Table III below.

TABLE III

| | Tellurium | | | Cadmium | | | Zinc | |
|---|---|---|---|---|---|---|---|---|
| | Max. Value | Avg. | | Max. Value | Avg. | | Max. Value | Avg. |
| C | 2000 | 1100 | C | 300 | 200 | C | 150 | 120 |
| N | 300 | 130 | N | 25 | 15 | N | 30 | 20 |
| O | 5500 | 2500 | O | 250 | 180 | O | 150 | 85 |
| Na | 10 | 2 | Al | 5 | 1 | Si | 5 | 0.8 |

TABLE III-continued

| | Tellurium | | | Cadmium | | | Zinc | |
|---|---|---|---|---|---|---|---|---|
| | Max. Value | Avg. | | Max. Value | Avg. | | Max. Value | Avg. |
| Mg | 10 | 1 | S | 20 | 5 | Fe | 20 | 7 |
| Si | 40 | 21 | Cl | 5 | 3 | Cd | 300 | 160 |
| Cl | 20 | 10 | Ti | 1 | 0.3 | Te | 10 | 5 |
| Ti | 5 | 2 | Ni | 3 | 0.5 | Tl | 15 | 10 |
| Fe | 10 | 5 | Tl | 5 | 2 | Pb | 5 | 2 |
| Ga | 5 | 2 | Pb | 5 | 2 | | | |

As further illustration of the results achievable by the in situ refining system, Table IV shows typical GDMS analysis of tellurium, cadmium and zinc refined by this system, in parts per billion. "ISDZR" refers to material processed according to the invention and is compared to the purity of commercially available materials ("Comm. Mat."). Where "—" appears, this means "not detected by GDMS."

TABLE IV

| | CADMIUM | | TELLURIUM | | ZINC | |
|---|---|---|---|---|---|---|
| | Comm. Mat. | ISDZR | Comm. Mat. | ISDZR | Comm. Mat. | ISDZR |
| Li | — | — | — | — | — | — |
| Be | — | — | — | — | — | — |
| B | 0.0 | — | 0.1 | — | — | — |
| C | 253.8 | 165.0 | 651.5 | 633.2 | 107 | 120 |
| N | 17.1 | 13.7 | 115.2 | 112.8 | 112 | 21 |
| O | 203.7 | 176.7 | 1542.2 | 1130.0 | 1242 | 87 |
| F | 1.8 | — | — | — | — | — |
| Na | 0.0 | — | 1.8 | 1.1 | — | — |
| Mg | — | — | 0.8 | 0.5 | — | — |
| Al | 1.2 | 0.3 | 2.6 | 4.5 | — | — |
| Si | 1.8 | 0.4 | 25.4 | 59.2 | 1.0 | 0.7 |
| P | 0.0 | — | — | — | — | — |
| S | 6.9 | 5.3 | — | — | 2.0 | — |
| Cl | 0.8 | 0.3 | 0.4 | 3.9 | 0.5 | — |
| K | — | — | — | — | — | — |
| Ca | — | — | 0.5 | — | — | — |
| Sc | — | — | — | — | — | — |
| Ti | 1.4 | 0.2 | 0.5 | 0.1 | 0.2 | — |
| V | — | — | — | — | — | — |
| Cr | 0.0 | — | — | — | — | — |
| Mn | — | — | — | — | 0.3 | — |
| Fe | 1.0 | — | 2.1 | 1.1 | 118 | 7.5 |
| Co | 0.3 | — | — | — | 0.2 | — |
| Ni | 5.4 | 0.7 | 1.1 | — | 1.7 | — |
| Cu | 37.1 | 0.1 | — | — | 16.7 | — |
| Zn | 22.0 | 39.5 | 0.1 | — | Maj. | Maj. |
| Ga | 0.0 | — | 0.7 | 0.4 | — | — |
| Ge | — | — | — | — | 20.7 | — |
| As | — | — | 0.2 | 2.5 | — | — |
| Se | 0.1 | 0.7 | 84.0 | 1997.0 | — | — |
| Br | — | — | NR | — | — | — |
| Rb | — | — | — | — | — | — |
| Sr | — | — | — | — | — | — |
| Y | — | — | — | — | — | — |
| Zr | — | — | — | — | — | 0.0 |
| Nb | — | — | — | — | — | — |
| Mo | — | — | — | — | — | — |
| Ag | — | — | 0.1 | — | 7.7 | — |
| Cd | — | Maj. | 59.6 | — | 49.3 | 170.0 |
| In | — | — | — | — | — | — |
| Sn | — | — | — | — | — | — |
| Sb | 4.4 | — | — | — | — | 0.2 |
| Te | 149.9 | 35.7 | — | — | 4.2 | 5.0 |
| I | — | — | — | — | — | — |
| Cs | — | — | — | — | — | — |
| Ba | — | — | — | — | — | — |
| La | — | — | — | — | — | — |
| Ce | — | — | — | — | — | — |
| Hf | — | — | — | — | — | — |

TABLE IV-continued

|  | CADMIUM | | TELLURIUM | | ZINC | |
|---|---|---|---|---|---|---|
|  | Comm. Mat. | ISDZR | Comm. Mat. | ISDZR | Comm. Mat. | ISDZR |
| W | 0.3 | 0.4 | — | — | — | — |
| Pt | 0.0 | — | — | — | — | 0.4 |
| Au | — | — | 0.0 | — | — | — |
| Hg | 2.7 | 1.8 | — | — | — | — |
| Tl | 0.2 | 0.1 | — | — | — | 8.5 |
| Pb | 4.2 | 0.8 | — | — | 0.1 | 1.5 |
| Bi | 0.0 | — | 0.5 | 0.2 | — | — |
| Th | — | — | — | — | — | — |
| U | — | — | — | — | — | — |
| Total | 717 | 442 | 2489 | 2944 | 1683 | 421 |
| Metallic | 243 | 86 | 110 | 2128 | 222 | 134 |
| Non-isoelectronic | 61 | 3 | 12 | 15 | 166 | 19 |

The concentrations of copper in cadmium and iron, copper and nickel in zinc are good examples of decreased impurity levels. The process also may be applied for selenium purification as well as tellurium, cadmium and zinc and other elements in Groups IIA and VIB. For cadmium, tellurium and zinc, the distillation temperature is advantageously in the range of 1.2–1.4 times the absolute melting temperature. The condensation temperature is approximately 5° C. above the melting temperature. It has been determined that preferred operating conditions include a pressure of between 0.1–1 torr and a temperature adjustment to produce the desired distillation rate of less than 600 grams/hour. Distillation and condensation occur simultaneously over a period of several hours and material in the feed boat is continuously distilled and migrates to the "cooler" collection boat, where it is collected as a liquid. For selenium purification, the distillation temperature may be nominally 400° C., the collection temperature 225° C. and the zone temperature 220° C. Conditions for other elements may be readily determinable depending on impurities present.

For purposes of producing or refining material to be used in infrared detector devices, the elimination of copper and other transition elements in tellurium, cadmium and zinc is very important. The present system has the capability of reducing the levels of these impurities to well below acceptable limits.

The travel speed of the heating elements in the refining zone is important. This speed affects the separation coefficient, i.e. removal efficiency, of each impurity and is dependent on the apparatus. However, heater temperature settings and zone lengths are not critical provided zones are maintained that do not impinge on each other. Regardless of the temperature setting, molten and solid zone lengths and the solid/liquid interface of each zone is at the melting temperature and should move at the same speed the heaters move.

The in situ refining process can employ a wide range of starting materials. For illustration herein, the examples provided have been applied to zone-refined feed materials with purity of 99.9% or total metallic impurity concentrations less than 1,000 ppb (99.999% purity). However, it has also been determined that with slower distillation rates, materials with total impurity concentrations as high as 100,000 ppb (99.99% purity), or more, can also be used.

It is apparent from the foregoing that various changes and modifications may be made without departing from the invention. Accordingly, the scope of the invention should be limited only by the appended claims, wherein

What is claimed is:

1. A system in situ refining of high purity material to further purify said material comprising:

a hermetically sealed apparatus divided into at least one distillation section and at least one zone refining section;

a receptacle disposed in each section;

means for controlling the temperature separately in each section comprising at least one temperature control loop for each section;

means to vaporize high purity material in the receptacle in the distillation section to produce a distillate;

means to condense said distillate in the receptacle as alternate solid and liquid segments; and means to maintain the material in said zone refining receptacle as alternate solid and liquid segments; and means to progressively move liquid segments toward at least one end of said zone refining receptacle while solidifying the material behind the progressively moved liquid segments to urge impurities in said material toward the end.

2. A system according to claim 1 further comprising means to control the pressure in said apparatus so that impurities with relatively low vapor pressure are not vaporized and impurities with high vapor pressure are not condensed.

* * * * *

UNITED STATES PATENT AND TRADEMARK OFFICE
CERTIFICATE OF CORRECTION

PATENT NO. : 5,513,834
DATED : May 7, 1996
INVENTOR(S) : Gerald B. Feldewerth; Alan B. I. Bollong; David C. Bunnell It is certified that error appears in the above-indentified patent and that said Letters Patent is hereby corrected as shown below:

Column 2, line 38, after "ends" replace "arid" with -- and --.

Column 6, line 60, in Table IV, after "Sn" replace the first dash with -- 1.3 --.

Signed and Sealed this

Twenty-second Day of October, 1996

Attest:

BRUCE LEHMAN

Attesting Officer

Commissioner of Patents and Trademarks